United States Patent [19]

Pauliukonis

[11] Patent Number: 4,501,289
[45] Date of Patent: Feb. 26, 1985

[54] FLUID PROPORTIONING DIVERTER VALVE

[76] Inventor: Richard S. Pauliukonis, 6660 Greenbriar Dr., Cleveland, Ohio 44130

[21] Appl. No.: 410,870

[22] Filed: Aug. 24, 1982

[51] Int. Cl.³ .............................................. F16K 43/00
[52] U.S. Cl. .................................. 137/315; 137/625.5; 251/63.6; 251/268; 251/278; 251/357
[58] Field of Search ............... 137/625.5, 315; 251/14, 251/62, 63.6, 267, 268, 321, 322, 323, 278, 357

[56] References Cited

U.S. PATENT DOCUMENTS

| | | | |
|---|---|---|---|
| 2,645,451 | 7/1953 | Gladden | 137/625.5 |
| 2,892,608 | 6/1959 | Collins | 137/625.5 |
| 2,908,477 | 10/1959 | Buri | 251/14 |
| 3,188,048 | 6/1965 | Sutherlund | 137/625.5 |
| 3,593,745 | 7/1971 | Myers | 137/625.5 |
| 4,145,025 | 3/1979 | Bergeron | 251/63.6 |
| 4,216,793 | 8/1980 | Volgstadt et al. | 137/318 |
| 4,224,962 | 9/1980 | Orszullock | 137/625.5 |
| 4,316,482 | 2/1982 | Pearce et al. | 251/14 |

Primary Examiner—George L. Walton
Attorney, Agent, or Firm—R. S. Pauliukonis

[57] ABSTRACT

A fluid proportioning diverter valve capable or selective flow control between 3 fluid ports incorporated inside an elongated valve housing is provided with a central differential diameter bore passing therethrough between the housing ends and adaptable of receiving slidably an elongated valving stem of which a first end serves as a diverter operating means substantially atop thereof while internally separated by a seal from a second stem end provided with an end seal to divert fluid valved between said ports in any flow ratio desired when the stem becomes shifted axially inside the bore to assume various positions permitting fluid flow between either a first fluid supply port means and a first fluid discharge port means entering the bore via a wall or the first fluid supply port means and a third bottom discharge port means inside a bottom closure means and defined by two extreme stem locations inside thereof while also permitting numerous other stem positions therein to feed both the first side wall and the bottom discharge port means from the fluid supply port means, and vice-versa, stem position change means including either manual or pilot controls, including novel mean for stem assembly physically inside the housing bore by a section of an elastomer tubing inserted into the second stem end in final stages of initial valve assembly.

10 Claims, 4 Drawing Figures

FIG. 1-a

FLUID PROPORTIONING DIVERTER VALVE

This invention relates to diverter valves generally, and to simplified 3-way proportioning diverters specifically.

Generally, diverter valves permit flow redirection from a single source supply port to either of the two receiver ports alternatingly by feeding fluid from a supply to a first receiver while a second receiver is disconnected therefrom or simultaneously to both receiver ports from a single supply port at flow rates that are controlled by diverter setting, i.e. by adjusting position of valving provisions incorporated therein, such as a valving stem that can be shifted inside the valve to any position selected by the valve operator in accordance with process requirements. Many applications require feeding two separate streams into a single receiver port simultaneously or alternatingly, requiring to have either two position stem control or provisions for infinite settings of the stem to insure accurate flow rates at specified flow proportions. Diverter valves find many uses in various fields but predominantly they are employed in testing laboratories which most often use two position diverters operated by a pilot fluid. Industrial processes, including systems wherein the process is dynamic requiring additives of sort in various proportions dictate the use of diverters that entail multisetting provisions beyond those two position diverters provide. Such multiposition provisions include screw control which starts as a manual valve but is not limited thereto because it may end up of being motorized and very complicated let alone costly device.

The primary object of the present invention is, therefore, to provide a diverter design that is simple and adaptable to both pilot fluid and manual controls.

Another object of this invention is to provide a novel structure which incorporates a single seal element for both functions namely for diverter sealing in two positions of the stem and also for physical stem holding in final assembly of the valve. Obviously, it is desirable to provide valves of this general type which are simple in design, versatile in operation and construction, and also inexpensive to produce. These and other objects and advantages of the invention will become more fully apparent from the ensuing description of an embodiment of the invention taken together with the accompanying drawings.

IN THE DRAWINGS

FIG. 1 is a cross-sectional view of a 3-ported proportioning diverter valve operated by a piloted stem shown in a first normally closed side port position while pilot port is to exhaust and the stem piston is de-energized.

FIG. 1-a shows the same valve as in FIG. 1 except for stem location change therein.

Figure 1:
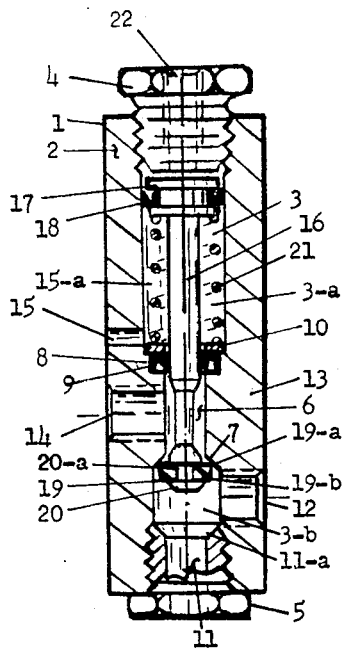

Shown in FIG. 1 and FIG. 1-a is an assembly of a diverter 3-ported valve 1 having an elongated housing 2 with a central bore 3 of different diameters passing between a first top end portion 3-a adaptable of being closed by a first top end closure 4 and a second bottom end portion 3-b adaptable of being closed by a second bottom end closure 5 including a third intermediate diameter bore portion 6 interconnecting the top and bottom end portions so as to have a first valving seat 7 adjoining bottom and intermediate diameter bore portions while on top of the intermediate diameter bore portion 6 a counterbore 8 provided with a seal 9 backed up with a washer 10 interconnects with top end portion 3-a.

A set of fluid ports for fluid communication with bore 3 includes a first bottom port 11 in the center of the bottom end closure 5 shown in communication with a first side port 12 entering bore 3 via side wall 13 in FIG. 1 while in FIG. 1-a a second side port 14 a slight distance away from port 12 enters bore 3 via side wall 13 from the opposite side thereof for fluid communication therebetween.

An elongated valving stem 16 having also different diameters to correspond with the different diameter bore 3 is provided with a piston 17 with seal 18 at the first top end thereof while the second bottom end 20 of a diameter slightly less than the diameter of the intermediate diameter bore portion 6 is provided with larger seal 19 which becomes inserted into peripheral groove 20-a of stem end 20 against seat 7 in final valve assembly before bottom end closure 5 is secured inside bottom end portion 3-b to physically hold stem 16 inside bore 3 in the position shown in FIG. 1 by a compression spring 21 lodged between washer 10 and underside of piston 17 maintaining valve in a first port 14 normally closed position automatically. It should be noted here that a top lip 19-a of seal 19 which may be a rectangular section cut from a fluid compatible elastomer tubing but not limited thereto because an O-ring seal may be sometimes used instead is ideal for edge sealing valve bubble-tight shut against valving seat 7 provided therein.

FIG. 1-a shows valve in a second port 11 closed position with bottom lip 19-b inside a second valving seat 11-a of closure 5 serving as sealing edge to maintain port 11 bubble-tight shut when stem 16 is shifted inside bore 3 from the first to the second locations, identifiable by reference to FIGS. 1 and 1-a.

Referring back to FIGS. 1 and 1-a it is essential to note that the diverter position can be changed by allowing pilot fluid which may be compressed air or the like enter a pilot fluid port 22 provided in the center of the top end closure 4 and exert an end force over stem piston 17 large enough to overcome biasing force spring 21 exerts to underside of piston 17 resulting in stem location change from that shown in FIG. 1 to that shown in FIG. 1-a. Not only piston 17, being essentially an operator means for lower valving section that is controlled by stem lower seal 19, is shifted when pilot fluid enters pilot cavity 23, clearly visible in FIG. 1-a, but also flow direction through the lower section of the diverter serving in essence as an independent fluid proportioning means wetted by fluid valved changes drastically. Ergo, when stem is in a first location shown in FIG. 1, flow may proceed from either port 12 to port 11 or vice-versa but when stem location is changed to that shown in FIG. 1-a, port 11 becomes disconnected entirely by the seal 19 while fluid communication proceeds from port 12 to port 14 or vice versa, without any of the fluids entering diverter operating section separated from valving section by a peripheral stem seal 9 inside counterbore 8. To insure that this separation is permanent, more than a single seal 9 may be used in counterbore 8, depending on system pressures and operating requirements. An air vent 15 to bleed spring cavity 15-a may sometimes be employed for purpose of seal inspection or prevention of pressure build up therein. Obviously, stem location is dependent on the supply of the pilot fluid to or from the pilot cavity 23, unless other operating means are used. These other operating means are clearly visible from FIGS. 2 and 3 which illustrate modifications in valve operating means incorporated into the same valve housing 2 provided with the same bottom end closure means 5 which are shown in section.

Figure 2:
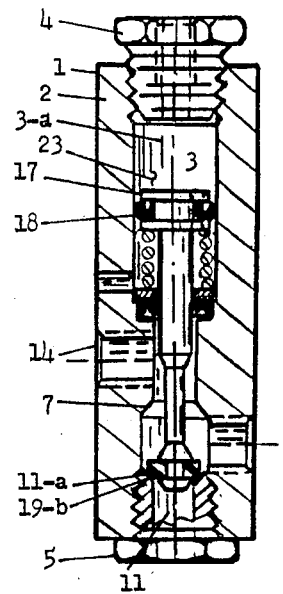
FIG. 2 shows the same valve as in FIG. 1 except for valve operator which is manual and provided with a rising screw when adjusted for stem position change.
Figure 2:
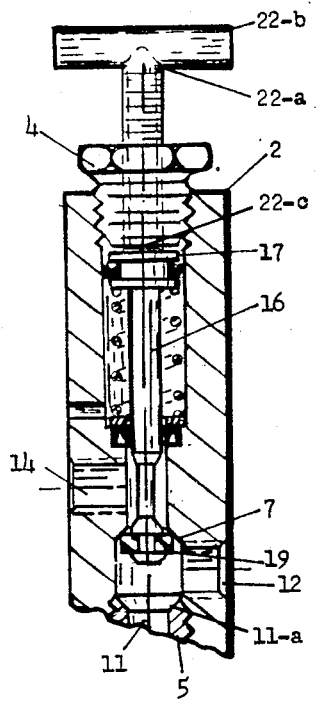

FIG. 2 shows such modification by incorporating into the top end closure 4 a hand screw 22-a which replaces pilot port 22 which also may have been threaded. By turning screw handle 22-b inside threaded top end closure 4, hand screw 22-a may be raised or lowered externally while internally it may change stem location by having screw end 22-c press against piston 17 for shifting stem 16 downward against spring 21 from the position shown until stem seal 19 enters valving seat 11-a of closure 5, shown sectioned, to render port 11 bubble-tight shut when seal lip 19-b firmly engages therein (not shown), similarly to the engagement shown in FIG. 1-a, permitting not only stem position change between extremes valving seats 7 and 11-a a define but also numerous other stem locations therebetween thereby allowing a plurality of flow proportions in many ratios flowed between ports 11, 12 and 14. This simple modification alone is unparalleled in terms of simplicity in the design subject to this invention. The rising stem so incorporated into the exact design of the piloted valve of FIG. 1 provides additional advantages in determination of ratios proportioned inside the lower valving section of the diverter. In fact, the amount of screw raised above the top end closure 4 may be calibrated to correspond with volumetric flow through ports 11,12 and 14, thereby providing a precise instrument for flow control, which is versatile in operation and construction, simple and therefore inexpensive to produce as well, meeting all the objectives set forth in this invention.

Figure 3:
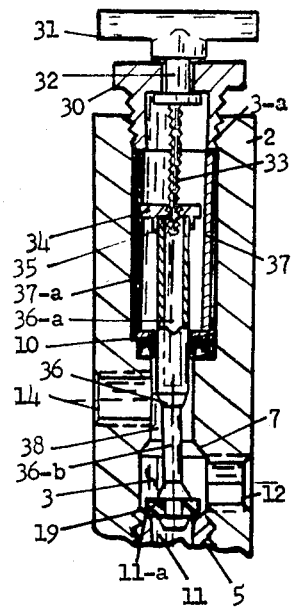
FIG. 3 shows the same valve as in FIG. 2 except for modification in screw design to permit non-rising screw operation for stem position change.

To cover valve applications which are space limited, it was necessary to introduce a design modification with non-rising stem as that shown in FIG. 3 which includes more drastic changes to valve operator while valving section is identical to that shown in FIGS. 1 and 2.

Shown in FIG. 3 is the same housing 2 including top bore portion 3-a of bore 3 which incorporates a slightly modified first top end closure 30 to accomodate a handle 31 provided with a bearing section 32 inside thereof which terminates with a screw 33 that turns inside a guide piston means 34 which is threaded and secured permanently to the top stem end 35 replacing formerly employed piston 17 with seal 18 to permit location change of stem 36 for flow position change through the lower valving section thereof in an identical fashion described while discussing the operation of the diverter of FIG. 2. Just like in FIG. 2, in FIG. 3 air vent 15 may be eliminated as a nuisance here while a necessity in pilot operated diverter of FIG. 1 discussed before. To insure no turning of stem 36 when handle 31 is turned, a guide tube 37 with a longitudinal slit 37-a to guide piston means 34 was secured inside bore section 3-a by closure 30 on top of washer 10 that retains seal 9 inside counterbore 8 of bore 3 dispensing with spring 21 altogether, and stem 36 was counterbored as shown by 36-a to accomodate screw 33 inside thereof when handle 31 is turned for stem location change with multiple settings of stem end 20 provided with seal 19 controlling fluid flow between ports 11,12 and 14 of housing 2. And when seal 19 is engaged inside valving seat 7, flow proceeds between ports 12 and 11 or vice versa. An when seal 19 is engaged inside valving seal 11-a, flow proceeds between ports 12 and 14 or vice-versa. But, when stem location changes due to the turning of handle 31 from that shown in FIG. 3, fluid communication may be established between all 3 ports. Assuming that port 12 serves as fluid supply port, flow may proceed through port 14 only when stem 36 is in location FIG. 3 shows. Raising stem 36 from valving seat 11-a would gradually permit increased flow via port 11 while the bulk of fluid is flowed via port 14 until the proximity of stem end 20 with seal 19 changes and approaches valving seat 7 whereby the reversal takes place, and the bulk of fluid will be directed from port 12 to port 11 where least resistance to flow prevails while only fraction of flow will be directed to port 14 because of more resistance to flow seal 19 against seat 7 will induce alone and in combination with extra resistance flow must experience while entering annulus 38 created between a stem section 36-b of reduced diameter and the diameter of intermediate bore section 6 provided with port 14, operating in exactly the same fashion design of FIG. 2 with rising stem works.

Without exception, the designs depicted in FIGS. 1, 2 and 3 identify the most versatile and simple proportioning diverter. However, some changes may be made in the construction and arrangement of the details indeed without departing from the real spirit and scope of this invention, disclosed and claimed herein.

What is claimed is:

1. A fluid proportioning diverter valve comprising:

a single elongated housing unit with a central bore of different diameters passing therethrough including a first top end portion adaptable of being closed by a first top end closure means, and a second bottom end portion adaptable of being closed by a second bottom end closure means including a third intermediate diameter bore portion adjoining said top and bottom end portions of said bore substantially midway of said housing, said first top end portion defining a piston operating chamber and said second bottom end portion defining a valving chamber, a set of fluid ports for fluid communication with said bore including a first bottom port means at the center of said bottom end closure means, a first side port means entering said bore via a housing wall adjacent said first bottom port means in said second bottom end portion of said bore and a second side port means on top thereof entering said bore via said housing wall substantially midway along the length of said intermediate diameter bore portion, an elongated valve stem provided with a first top end and a second bottom end including a first seal inside a groove of said bottom end thereof is slidably received inside said bore and movable therein in an operable relationship with said fluid ports between said first top and second bottom end closure means, a second stem seal placed radially and secured permanently inside a stationary counterbore of said bore adjacent said top and intermediate portions for to prevent fluid leakage therebetween, said valve stem includes a piston means for actuating said valve stem between an open and a closed positions, when said stem is in a first top position, an upper lid of said first seal is engaged in a first valve seat provided therein between said intermediate diameter bore portion and said second bottom end portion of slightly larger diameter for shutting off said second port entirely while allowing fluid communication between said first side and said first bottom port means until said stem is actuated from said first top position to a second selected position inside said bore allowing fluid communication between said first side port means, said second side port means and said first bottom port means prior to having a lower lip of said first seal engage a second valve seat inside said bottom end closure means thereby allowing fluid proportioning at selected ratios between said first, second and bottom port means, when said stem is in another second selected position, said lower lip of said first seal is engaged in said second valve seat for allowing fluid communication between said first and second side port means while closing fluid communication to said bottom port means, including means for top mounting said second seal within said counterbore with a biasing means for retaining said second seal therein, means for top mounting said valve stem through said second seal into a position in said second bottom end portion of said bore to permit only said first seal to be mounted into said groove prior to said second end closure means being placed inside said second bottom end portion of said bore in a single step without disturbing or removing any other valve components thereby facilitating novel means of assemblying in said valve said piston means, said biasing means with said second seal and said first seal and also novel means of holding said stem therein physically by said first seal.

2. A proportioning diverter valve as in claim 1 wherein said piston means include a hand operating screw spaced inside said first top end closure means co-axial to said stem so as to move said valve stem between said open and closed positions.

3. A proportioning diverter valve as in claim 1 wherein said top end closure means includes a pilot port inside a center thereafter to deliver of a pressurized working fluid to said piston operating chamber for actuating said piston of said piston means responsive to a pressure force of said working fluid exerted over it when supplied to said piston operating chamber for moving said valve stem between said valve open and closed positions.

said biasing means includes a spring force means for return of said stem to said first top position when said pressurized working fluid is to exhaust, an atmospheric vent entering said first top end portion of said bore via said wall adjacent said second stem seal to insure an easy stem operation during said stem position change and to provide visual inspection station for control of seal integrity in case of seal failure in service, and when said pressurized working fluid is allowed to enter said said piston operating chamber, said valve stem is forced to assume said second bottom position against said spring biasing force means rendering said first bottom port means closed to fluid communication while allowing fluid communication between said first and second side ports, and when said pressurized fluid is to exhaust from said first top end portion of said bore, said stem assumes said first top position automatically by said spring to render said second side port means closed while diverting fluid communication from said first side port to said first bottom port until said stem is actuated again by said pilot fluid.

4. A fluid proportioning diverter valve as in claim 1 wherein said piston means includes a hand operating screw spaced inside said first top end closure means co-axial to said stem so as to actuate said valve stem between said open and closed positions said screw is provided with an external handle adaptable of screw turning inside a centrally provided thread of said first top end closure means while an internal screw end inside said first piston operating chamber rests against said piston means of said valve stem so as to push said stem for said position change therein downward when said screw is turned one direction while when said screw is turned the opposite direction, allowing said stem to return upward to any position selected therein between said first top and said second bottom selected positions, thereby facilitating multiple stem positions inside said bore and a variety of ratios of flow proportioning between said fluid port means, and when said stem is in said first top position, said screw protrudes said top end closure means a larger distance than when said stem is in said second bottom location with said screw protruding a smaller distance.

5. A fluid proportioning diverter valve as in claim 1 wherein said piston means includes a hand operating screw spaced inside said first top end closure means co-axial to said stem so as to actuate said stem between said open and closed positions, including an external screw turning handle at one end thereof while the other end is adaptable of entering a threaded section inside said first top end of said stem to move said stem between said first top and said second selected bottom positions in response to turning motion screw provides, allowing multiple stem positions inside said bore with a plurality of flow ratios between said fluid port means to render flow proportioning at any desired value preset by screw, including means for preventing stem rotation during screw turning for said stem position change, said screw including a bearing surface adjacent said turning handle, said bearing surface fixed within said first top end closure means so that the screw when turned does not protrude diverter top at all but moves said stem therein instead.

6. A fluid proportioning diverter valve as in claim 1 wherein said piston means includes a piston of a size slightly smaller than the diameter of said first top end portion of said bore including a peripheral piston seal incorporated therein and movably sealably inside thereof in response to a pilot fluid pressure supplied thereto via a pilot supply port incorporated into said first top end closure means, a compression spring lodged between an underside of said piston and a washer covering said second stem seal, and when said piston top becomes subjected to said pilot fluid pressure, said stem moves from said first top position to said second bottom position and also stays therein for as long as the pilot fluid exerts pressure over said piston, and when said pilot fluid pressure is exhausted, said stem returns back to the original first top position automatically due to a continuously prevailing force said spring exerts over said piston underside, and vice-versa.

7. A fluid proportioning diverter valve as in claim 1 wherein said first seal of said stem-second-bottom-end is produced by cutting a rectangular section from an elastomer tubing compatible with fluids thereby producing said top and said bottom lips at the extremities thereof to ideally serve as sealing edges inside said valving seats when said seal is placed therein through said second bottom-end portion for stem position control.

8. A fluid proportioning diverter valve as in claim 1 wherein said first seal of said stem-second-bottom end is and O-ring compatible with fluids for sealing inside said valving seats when said stem is shifted therein from said first to said second postions.

9. A fluid proportioning diverter valve as in claim 1 wherein said first top end of said valving stem is hollow to receive a turning screw therein of said operating means for said diverter lower sections to facilitate stem position change from said first top and said second selected bottom positions with stop-overs therebetween allowing said fluid communication between all port means, said screw is fixed turningly inside a bearing of said first top end closure means to move said stem provided with a thread at the first top end thereof, including means for preventing stem turning therein when said operating screw is rotated for stem position change.

10. A fluid proportioning diverter as in claim 1 wherein said second stem seal is of U-cup configuration with channels thereof facing said lower sections wetted by fluid valved between said port means.

* * * * *